166° C. and stirred for about ½ hour, after which the pressure was reduced to 40 mm. Hg for 45 minutes during which heating was continued. Infrared analysis of the product showed that the alkenyl succinimide had been formed.

EXAMPLE 2

52.5 g. of polyethylene glycol amine having a molecular weight of 500, that is, hendecaethylene glycol amine, was heated to a temperature of 102° C. and 100 g. of polyisobutenyl succinic anhydride, as described in Example 1, was added through a dropping funnel over a period of ½ hour. The mixture was heated at 100° to 104° C. for another ½ hour and finally topped under full vacuum for about 1 hour to a pot temperature of 155° C. Infrared analysis showed that the corresponding N-polyethylene glycol substituted polyisobutenyl succinimide had been formed.

EXAMPLE 3

46 g. of polyethylene glycol having a molecular weight of 350 (octaethylene glycol) was heated with 100 g. of polyisobutenyl succinic anhydride having a molecular weight of 1000 in 200 ml. of benzene under reflux conditions for about 12 hours. Water was removed by azeotroping. The polyglycol monoester of polyisobutenyl succinic acid was precipitated with methanol. Infrared analysis showed that the polyisobutenyl succinic acid ester of polyethylene glycol had been formed.

EXAMPLE 4

46 g. of polyethylene glycol having a molecular weight of 350 (octaethylene glycol) and 100 g. of polyisobutenyl succinic anhydride having a molecular weight of 1000 were reacted using 7.1 g. of sodium methoxide catalyst. The polyethylene glycol in 100 ml. of benzene was first dried by azeotroping under reflux conditions. The sodium methoxide was then added and methanol was removed by distilling through a fractionating column. The polyisobutenyl succinic anhydride in 100 ml. of benzene was added next to the mixture. The reaction mixture was refluxed for 12 hours and the polymeric product precipitated with methanol, dried and titrated in a solution of acetone, ethyl ether, benzene and water (30:30:30:10). The infrared analysis of the product again showed that the alkenyl succinic acid ester of polyethylene glycol had been formed.

The effectiveness of the polyalkylene glycol reaction product of alkenyl succinic anhydride in accordance with the present invention was determined by testing an illustrative N-polyoxyethylene ether substituted alkenyl succinimide as a detergent additive in a mineral lubricating oil composition. In the tests, a solvent-refined paraffinic base Mid-Continent SAE 30 weight mineral lubricating oil was used as the base oil. To the base oil was added 1.25% by weight of the N-hendecaethylene glycol polyisobutenyl succinimide of Example 2 along with 10 mM./kg. of zinc butyl hexyl dithiophosphate and 2 mM./kg. zinc di-(tetradecylphenyl) dithiophosphate, typical inhibitors for lubricating oils.

The piston varnish rating of the lubricant composition of the invention as described above was obtained by the standard FL-2 test procedure as set out in the June 21, 1948, report of the Coordinating Research Council. In this test the lubricants are run in a 6-cylinder Chevrolet engine, using a low-grade gasoline especially prone to cause engine deposits. At the end of each test the engine is dismantled and the detergency or deposition properties of the lubricant compositions are determined by examining the engine deposits on the piston and visually rating them as to the amount of piston varnish present. The piston varnish ratings of the compositions are given in numerical terms on a scale of 0–10 with "10" representing the complete absence of deposits. Inspection of the engine showed that the piston varnish rating of the lubricating oil of the invention was 8.1, whereas the base oil without the polyalkylene glycol reaction product had a piston varnish rating of 2.5.

The efficacy of the lubricant compositions of the invention was also determined in the standard Caterpillar Engine Test "1-G." The procedure for this test as described in Military Specification MIL-L-45199A is more severe than the usual Caterpillar Engine Tests and determines the suitability of oils for diesel engine Series 3 conditions. In this test, 3.5% by weight of the N-hendecaethylene glycol polyisobutenyl succinic anhydride of Example 2 along with 12 mM./kg. of zinc di(tetradecylphenyl) dithiophosphate was run for 60 hours in the Caterpillar engine. At the conclusion of the test, the deposits in the piston ring grooves and on the piston lands were evaluated, and it was determined that the polyalkylene glycol reaction product was effective as a detergent in lubricants for diesel engine service.

The polyethylene glycol products of this invention are characterized as being "oil soluble." This is intended to mean that they are soluble in conventional mineral lubricating oils and other oil compositions such as fuels in a concentration of polyethylene glycol ester or amine product of at least about 0.1% by weight based on the total composition.

In the lubricating oil compositions of this invention, the polyalkylene glycol ester or amine product is used with lubricating oil base in amounts sufficient to improve the detergency of the base lubricating oil. Ordinarily, amounts of polyalkylene glycol ester or amine product of from about 0.1% to about 15% by weight are satisfactory for this purpose. In view of the excellent solubility characteristics of the polyalkylene glycol ester or amine products, a further feature of the invention lies in the preparation of lubricating oil concentrates containing higher percentages of polyalkylene glycol ester or amine products up to about 75%.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di-(2-ethylhexyl)-sebacate, tricresylphosphate and silicate esters, such as tetra-(2-ethylhexyl)-orthosilicate and hexa-(2-ethylbutoxy)-disiloxane. For present purposes the mineral lubricating oils are preferred, since they show the greatest detergency improvement.

Lubricant compositions within the scope of the present invention may also contain still other additives of conventional types, such as pour point depressants, viscosity index improvers, metallic detergents, oiliness and extreme pressure agents, anti-oxidants, dyes, blooming agents and the like.

Illustrative lubricant compositions of the aforementioned types containing additives other than the polymeric additive may include, for example, from about 0.1 to about 10% by weight of alkaline earth metal higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and $P_2S_5$, the reaction product of polybutene and $P_2S_5$ and the bivalent metal dihydrocarbon dithiophosphates, zinc butyl hexyl dithiophosphate and zinc di-(tetradecylphenyl) dithiophosphate. Metal salt detergents in amounts from about 0.1 to 10% which may also be used are the calcium petroleum sulfonates of the oil-soluble mahogany type and the calcium naphthenates.

Additional examples of alkylene glycol ester or amine reaction products in accordance with the invention are set out in the following table.

TABLE

| Alkenyl Portion | Mol. Wt. | Succinic Acid Portion | Mole ratio | Polyalkylene glycol ester or amine | Linkage group |
|---|---|---|---|---|---|
| Ethylene/propylene 1:1 copolymer | 1400 | Maleic anhydride | 1/1 | Methoxy polyethylene glycol (425 M.W.) amine | Imide. |
| Isobutene polymer | 700 | ....do.... | 0.5/1 | Polyethylene glycol (750 M.W.) amine | Diamide. |
| Do | 420 | Maleic acid | 1.5/1 | Octadecoxypolyethylene glycol (220 M.W.) amine | Mono(amine salt). |
| Propene/1-butene 1:1 copolymer | 950 | ....do.... | 1/1 | Poly-1,2-heptylene glycol (910 M.W.) amine | Di(amine salt). |
| Chlorinated polyisobutylene (1% chlorine) | 1200 | Maleic anhydride | 0.5/1 | Methoxy polyethylene glycol (350 M.W.) amine | Imide. |
| Isobutene polymer | 900 | ....do.... | 1/1 | Methoxy polyethylene glycol (350 M.W.) | Monoester. |
| Do | 280 | ....do.... | 1/1.5 | Polyethylene glycol (750 M.W.) | do. |

While the character of this invention has been described in detail with numerous examples, this has been done by way of illustration only and without limitation of the invention. It will be apparent to those skilled in the art that numerous modifications and variations of the illustrative examples may be made in the practice of the invention within the scope of the following claims.

What is claimed is:
1. Polyethylene glycol amine product selected from the group consisting of amine salts, amides, imides and mixtures thereof of a polyethylene glycol amine and an alkenyl succinic compound selected from the class consisting of alkenyl succinic acids of the structural formula

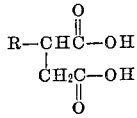

and alkenyl succinic anhydrides of the structural formula

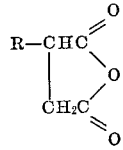

in which R is an alkenyl group having from 50 to 400 carbon atoms, said polyethylene glycol group having a molecular weight between about 88 and 1000 and containing at least two ethylene oxide units, the amino group being nontertiary and the molar ratio of polyethylene glycol amine to alkenyl succinic compound being from about 0.25:1 to 2:1.

2. A polyethylene glycol amine product according to claim 1 wherein the molar ratio of the alkenyl succinic compound to the polyethylene glycol amine is from about 0.8:1 to about 1.2:1.

3. A polyethylene glycol amine product according to claim 2 wherein the polyethylene glycol is hendecaethylene glycol amine.

4. A lubricating oil composition comprising a major proportion of mineral lubricating oil and from about 0.1% to about 15% by weight of the compound of claim 1.

5. A lubricating oil concentrate consisting essentially of mineral lubricating oil and from about 15 to 75% by weight of the compound of claim 1.

6. N-polyoxyethylene ether substituted alkenyl succinimide of the structural formula

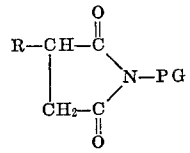

in which R is an alkenyl group having from 50 to 150 carbon atoms, and PG is polyethylene glycol having a molecular weight between about 88 and 1000.

References Cited

UNITED STATES PATENTS

| 3,184,474 | 5/1965 | Catto et al. |
| 3,197,409 | 7/1965 | de Vries. |
| 3,216,941 | 11/1965 | de Vries. |
| 3,219,666 | 11/1965 | Norman et al. |
| 3,255,108 | 6/1966 | Wiese. |
| 2,933,468 | 4/1960 | Aldridge et al. |
| 2,962,443 | 11/1960 | Rhodes. |
| 3,045,042 | 7/1962 | Staker. |
| 3,272,746 | 9/1966 | Le Suer et al. |
| 3,381,022 | 4/1968 | Le Suer. |

PATRICK P. GARVIN, Primary Examiner

U.S. Cl. X.R.

252—51.5, 56; 260—326.5, 501.17, 561

United States Patent Office 3,525,693
Patented Aug. 25, 1970

3,525,693
ALKENYL SUCCINIC POLYGLYCOL ETHER
Richard E. Lyle, El Cerrito, and Robert G. Anderson, Novato, Calif., assignors to Chevron Research Company, San Francisco, Calif., a corporation of Delaware
No Drawing. Filed Dec. 29, 1964, Ser. No. 421,993
Int. Cl. C10m 1/32; C07d 27/00; C07c 103/14
U.S. Cl. 252—34                                     6 Claims

ABSTRACT OF THE DISCLOSURE

Polyethylene glycol ester, amide or imide derivatives of alkenyl succinic anhydride are useful in lubricant compositions as ashless detergents.

---

This invention is concerned with alkenyl succinic polyglycol ethers in which the polyglycol ether portion is linked to the alkenyl succinic portion as an ester or an amine derivative. In its preferred embodiment, the present invention relates to alkenyl succinimido polyglycol ethers. More particularly, it relates to N-polyoxyethylene ether substituted alkenyl succinimide ashless detergents and lubricants containing them.

Modern internal combustion engines are generally characterized by high compression ratios and are normally operated at high speeds. When used in the so-called city stop-and-go driving conditions as frequently happens, internal combustion engines oftentimes do not reach the most efficient operating temperatures. Thus large amounts of partial oxidation products are formed and are blown by the piston rings into the crankcase. Most of these partial oxidation products are precursors to the formation of materials which are insoluble in oil and which tend to deposit out on various parts of the engine, such as the pistons, piston rings, filter screens, etc. Such deposits impede the flow of lubricating oil and seriously interfere with efficient engine operation and accelerate the wear of piston rings and cylinder walls.

For the purpose of preventing harmful deposits in internal combustion engines, it is necessary to incorporate detergents in the lubricating oil compositions, thus maintaining the oil insoluble materials in dispersion. For the most part, the detergents which are customarily added to internal combustion engine lubricating oils to reduce the formation of deposits, such as sludges and varnishes, have been metal organic compounds in which the metal is linked to an organic group through an oxygen atom. Although these metal organic compounds are effective as detergents for dispersing the deposit-forming precursors and oil insoluble materials formed from them, they have the disadvantage of forming metal ash deposits in the engine. Such metal ash deposits not only tend to interfere with efficient lubrication, but also tend to contribute to the fouling of valves and spark plugs, thereby resulting in ignition problems.

It has now been found that a useful new polyalkylene glycol reaction product of alkenyl succinic anhydride is obtained by heating a member of the group consisting of polyalkylene glycol and polyalkylene glycol amine with an alkenyl succinic compound selected from the class consisting of alkenyl succinic acids of the structural formula

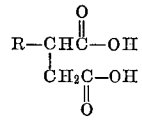

and alkenyl succinic anhydrides of the structural formula

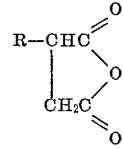

in which R is an alkenyl group having from 20 to 400 carbon atoms, preferably 50 to 150 carbon atoms, said polyalkylene glycol group having a molecular weight between about 88 and 1000 and containing at least two alkylene oxide units of from 2 to 7 carbon atoms each, the amino group of the preferred alkenyl succinimido polyglycol ethers being nontertiary and the molar ratio of polyalkylene glycol to alkenyl succinic compound being from about 0.25:1 to 2:1.

The polyalkylene glycol reaction product of alkenyl succinic anhydride in accordance with this invention possesses valuable dispersing properties in liquid compositions, such as paints, fuels, lubricating oils, greases and the like. When added to lubricating oil compositions in particular, the alkylene glycol reaction products are effective in reducing the formation of engine deposits, and since they contain no metal the formation of harmful metal ash deposits is completely avoided. The polyalkylene glycol amine reaction products in particular are preferred for general overall effectiveness in various types of service, including both gasoline engines and the higher temperature diesel engines.

In the preparation of the polyalkylene glycol ester reaction products of alkenyl succinic anhydride, the polyglycol or polyalkylene glycol or polyoxyalkylene ether, as it may be termed, reacts with the succinic anhydride groups or succinic acid groups to form typical monoester or diester compounds. Heating and conventional esterification catalysts, such as sodium methoxide, may be employed to accelerate the reaction.

In the preparation of the preferred polyalkylene glycol amine reaction products of alkenyl succinic anhydride, the alkylene glycol amine reacts with the succinic anhydride groups or succinic acid groups to form either amine salts, amides or imides or mixtures of such derivatives. Using polyalkylene glycol (PG) amine and succinic anhydride by way of illustration, the reaction leads first to cleavage of the anhydride and formation of an acid amide. The acid moiety may form at the same time an amine salt as shown by the formula

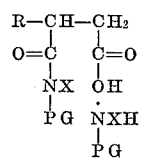

in which X is H, alkyl or PG, PG is oxyalkylene, as previously described, preferably $[CH_2CH_2O]_nR_1$; $R_1$ is H, alkyl or acyl, and $n$ is the number of recurring oxyalkylene units of the polyalkylene glycol amine. Additional heating to temperature of 90–200° C. causes elimination of water and formation of N-polyalkylene glycol-substituted imide, if X is H (primary amine). When X is alkyl or PG, the final product is a diamide.

An alternate synthesis route is the hydrolysis of the anhydride to the diacid; the latter, in the presence of amine, is first converted to the amine salt, then, upon moderate heating, to the mono- or diamide, and after heating at higher temperature, to the imide (if the amine is primary).

The amine salts and amides form readily when the succinic acid compound and alkylene glycol amine are mixed together. Heating may be used to accelerate the reaction. In the case of the imide formation, heating is required. Suitable temperatures for this purpose are generally in the range from about 75° C. to about 250° C., preferably from about 90° C. to about 200° C.

The preferred polyalkylene glycol amine reaction product of the invention is obtained by reacting about equal molar quantities of the alkenyl succinic compound and the polyalkylene glycol amine, that is, from about 0.8:1 to about 1.2:1 for the molar ratio of alkenyl succinic acid compound to polyalkylene glycol amine. The reactants are preferably heated to eliminate water resulting in the formation of the N-polyoxyalkylene ether substituted alkenyl succinimide of the structural formula

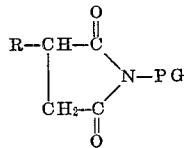

in which R and PG are as defined above. It is preferred that the alkenyl group R be a polymer of lower olefin, such as ethylene, propylene, butene-1, and isobutene, particularly the latter.

The reaction of alkylene glycol amine and succinic acid compound is conveniently carried out at atmospheric pressures, although vacuum or higher pressures may be used to facilitate water removal or the maintenance of higher temperatures. Solvents for the reaction products are conveniently employed to simplify handling of materials and to assist in the control of the reaction conditions. Suitable solvents include the hydrocarbons such as petroleum naphtha fractions and aromatic hydrocarbons.

The alkylene glycol amines are nontertiary amines generally characterized by the formulae $$HN(PG)_2 \text{ and } H_2NPG$$

where PG is polyalkylene glycol. As illustrated by the formulae, there is always at least one hydrogen group and one polyalkylene glycol group present. Such polyalkylene glycol amines are generally known to the art.

The polyalkylene glycols and polyalkylene glycol amines are suitably prepared by reaction of alkylene oxide or mixtures of alkylene oxide with alkylene glycol, alcohol, alkylene glycol amine or alkanol amine. For example, ethylene oxide is reacted with water or methanol to give the glycol or glycol ether or with ethanol amine to give polyethylene glycol amine. Suitable alcohols and alkanol amines for this purpose include methanol, dodecanol, ethylene glycol, ethanol amine, butanol amine, diethanol amine, etc.

The alkoxy and acyloxy polyalkylene glycols and their analogous amines may be preferred for many purposes, since the alkoxy and acyloxy terminal groups diminish the possibility of side reactions. Use of acids and alcohols, as mentioned above, provides glycols of these types. Terminally substituted polyalkylene glycol amines are suitably prepared in general by ammonolysis of the tosylate ester of the alkoxy or acyloxy type polyalkylene glycol. Briefly described, the alkoxy or other substituted polyalkylene glycol is reacted with paratoluene sulfonic acid or paratoluene sulfonyl chloride to form the tosylate ester, which is then reacted with an excess of ammonia to form the alkoxy polyalkylene glycol amine salt of the paratoluene sulfonic acid. The salt is then cleaved by reaction with an alkaline material, such as potassium carbonate, to give the polyalkylene glycol amine and alkali metal salt of paratoluene sulfonic acid.

The foregoing descriptions of the amination reaction products are equally applicable to the esterification products obtained when polyalkylene glycol is reacted with alkenyl succinic anhydride or acid. Instead of the amine linkage of the "PG" there is an ester oxygen link to one or both of the carbonyl groups.

The following polyalkylene glycol groups containing from 2 to 7 carbon atoms in each alkylene group are illustrative of the types described above:

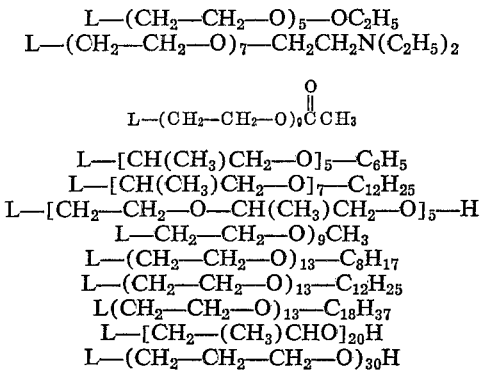

Amines of polyethylene glycol mixtures having average molecular weights of 220, 400, 1000, etc., and monoalkyl ethers thereof.

Amines of poly-1,2-propylene glycol mixtures having average molecular weights of 425, 1025, etc., and monoalkyl ethers thereof.

In the above polyalkylene glycol groups, L is the linking oxygen atom or the linking amino group which contains either 1 or 2 hydrogen atoms. Where there is only one amine hydrogen atom, the other valence may be satisfied by a polyalkylene glycol group of the above type or another organic group, such as an alkyl group or an aryl hydrocarbon group.

The preferred polyalkylene glycol groups are the polyethylene glycol groups having a molecular weight between about 88 and 1000 and containing at least two ethylene oxide units. More particularly, it is desired that the polyethylene glycol group contain at least five ethylene oxide units, the molecular weight of the polyethylene glycol portion being between about 220 and about 1000.

Further illustrations of the preparation of the polyalkylene glycol reaction products of this invention are given in the following examples. The proportions are on a weight basis unless otherwise specified.

EXAMPLE 1

An N-polyethylene glycol alkenyl succinimide, namely, N-hendecaethylene glycol polyisobutenyl succinimide was prepared. 200 g. of polyisobutenyl succinic anhydride was added to 37.91 g. of a hendecaethylene glycol primary amine at a temperature of 104° C. over a period of 1½ hours. The polyisobutenyl succinic anhydride was obtained by reacting a polybutene of 950 mole weight containing about 67 carbon atoms with maleic anhydride. The hendecaethylene glycol primary amine had a molecular weight of about 500. The reaction mixture was heated to